Figure 1:
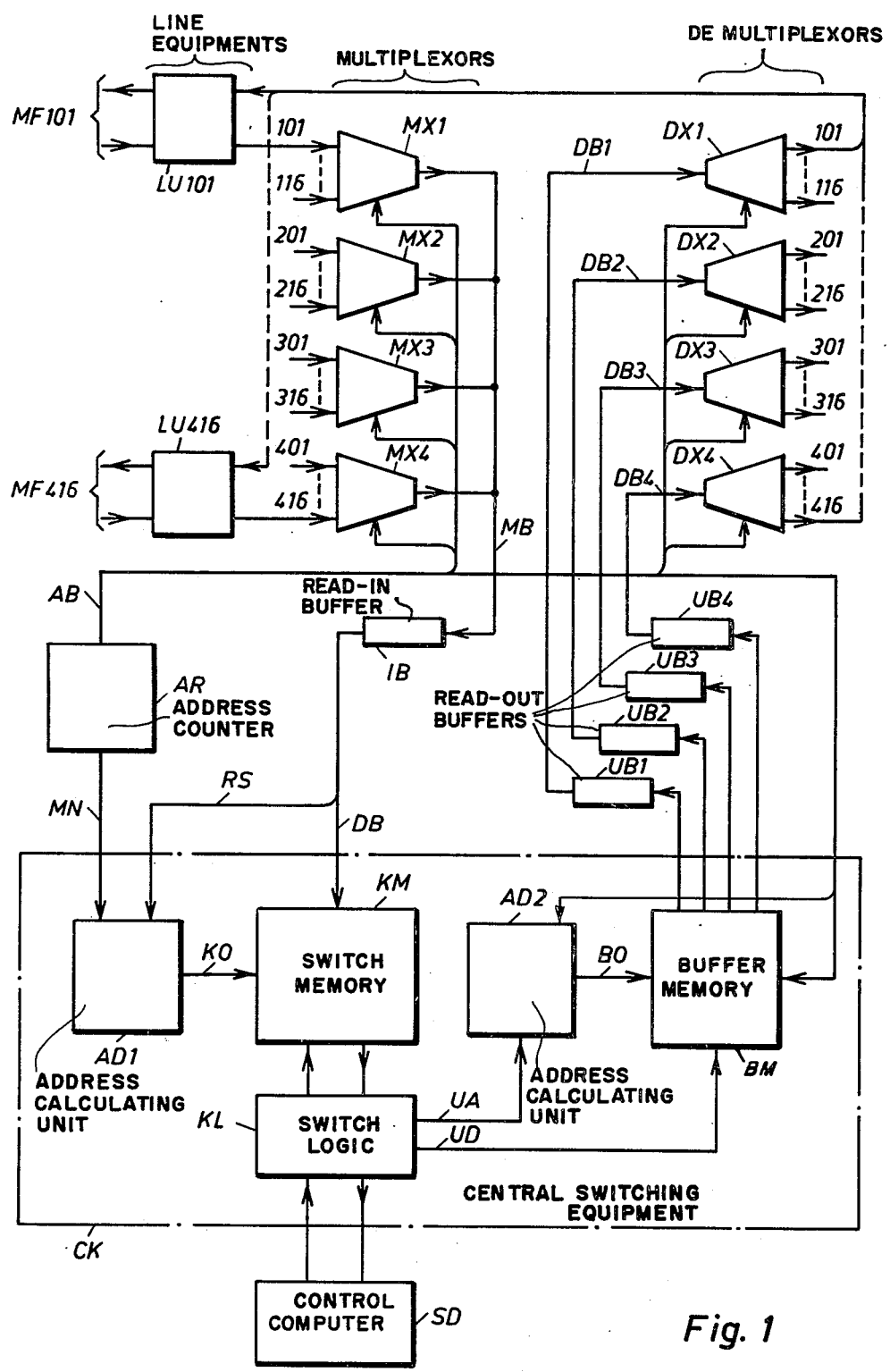

United States Patent

Leijonhufvud et al.

[11] 4,071,701
[45] Jan. 31, 1978

[54] METHOD OF AND APPARATUS FOR ADDRESSING A BUFFER MEMORY IN A TRANSIT EXCHANGE FOR SYNCHRONOUS DATA SIGNALS

[75] Inventors: Gösta Karl Knutsson Leijonhufvud, Huddinge; Per-Olof Thyselius, Tyreso, both of Sweden

[73] Assignee: Telefonaktiebolaget L M Ericsson, Stockholm, Sweden

[21] Appl. No.: 674,101

[22] Filed: Apr. 6, 1976

[30] Foreign Application Priority Data

Apr. 28, 1975 Sweden .................................. 7504895

[51] Int. Cl.² ............................................. H04J 3/00
[52] U.S. Cl. ................................................. 179/15 AT
[58] Field of Search ....................... 179/15 AQ, 15 AT

[56] References Cited

U.S. PATENT DOCUMENTS

| | | | |
|---|---|---|---|
| 3,766,322 | 10/1973 | Moffett et al. | 179/15 BV |
| 3,840,707 | 10/1974 | Hemdal | 179/15 AQ |
| 3,970,794 | 7/1976 | Neufang | 179/15 AQ |

*Primary Examiner*—Thomas W. Brown
*Attorney, Agent, or Firm*—Hane, Roberts, Spiecens & Cohen

[57] ABSTRACT

In a transit exchange which transfers data signals from incoming to outgoing TDM-links carrying data channels having more than one time slot per TDM-frame in accordance with the channels data rate, there is disclosed a method and apparatus for minimizing the transfer time of data through the exchange by providing a buffer memory with addressed locations which receive incoming data signals via a switch memory from the incoming links and feeds such data signals from the buffer memory to the outgoing links. The data signals in time slots of data channels are read into addressed locations of the buffer memory which are calculated by sequential additions to insure that a minimum time elapses before the data signals are read from the buffer memory.

4 Claims, 6 Drawing Figures

TRANSIT EXCHANGE

TRANSIT EXCHANGE

METHOD OF AND APPARATUS FOR ADDRESSING A BUFFER MEMORY IN A TRANSIT EXCHANGE FOR SYNCHRONOUS DATA SIGNALS

The present invention relates to a method of and an apparatus for minimizing the transfer time in a transit exchange which transfers synchronous data signals from incoming TDM-links to outgoing TDM-links for data signals belonging to data channels of the type to which is assigned more than one time slot in a TDM-frame in correspondance to the data rate of the data channel. Such a transit exchange includes a switch memory for the storage of incoming data signals in memory positions, each of which is assigned to one of the incoming data channels in the incoming links, and a buffer memory to which the data signals are transferred and stored in memory positions assigned to the time slots belonging to the respective outgoing channels in the outgoing links before they are sent out via these links. The write-in and the read-out operations in the buffer memory occur alternately at a repetition rate determined by the data rate of the respective channel in such a manner that the read-out to the outgoing TDM-links is made cyclically, each cycle encompassing the reading of a time slot with a certain sequence number to each of the links.

A transit exchange of the above described type is earlier described in the Swedish patent application No. 75.01678-2. For such storage of data signals in the buffer memory, an address calculating unit is included in the transit exchange which, being given the memory position of the first time slot belonging to the data channel and the data rate class of the data channel, determines the successive memory positions in the buffer memory to which the write-in is to be made. The address calculating unit can be designed such that, on the first write-in occasion, it chooses the memory position of the first time slot and then, by use of simple arithmetic calculations generates the addresses of the other memory positions according to a cyclic pattern. The drawback of such a solution is that no regard is taken to the read-out process, and therefore the elapsed time between write-in and read-out of a memory word becomes quite random and averages to half the cycle time of a TDM-frame. According to the invention, writing into the buffer memory is made to the memory position which is next for a read-out, and thus the transfer time in the buffer memory is limited to a value which is determined by the data rate class and corresponds to the temporal distance between two time slots.

The characteristics of the invention are defined by the claims.

Figure 2:
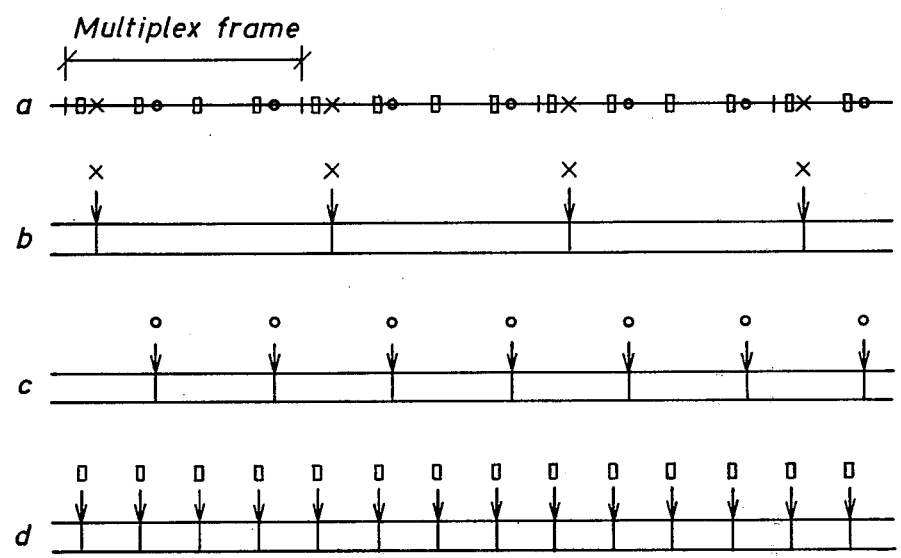
Figure 3:
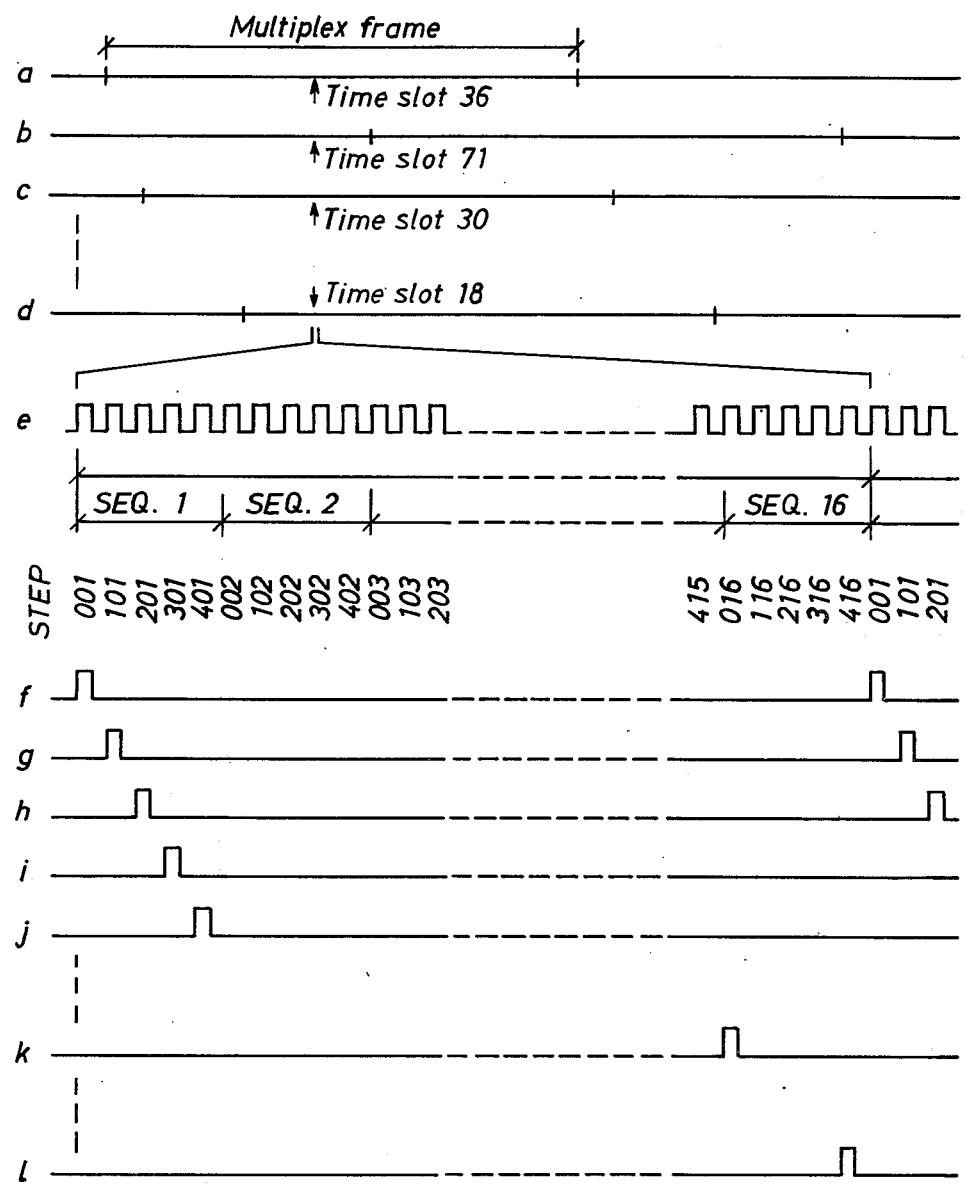
Figure 4:
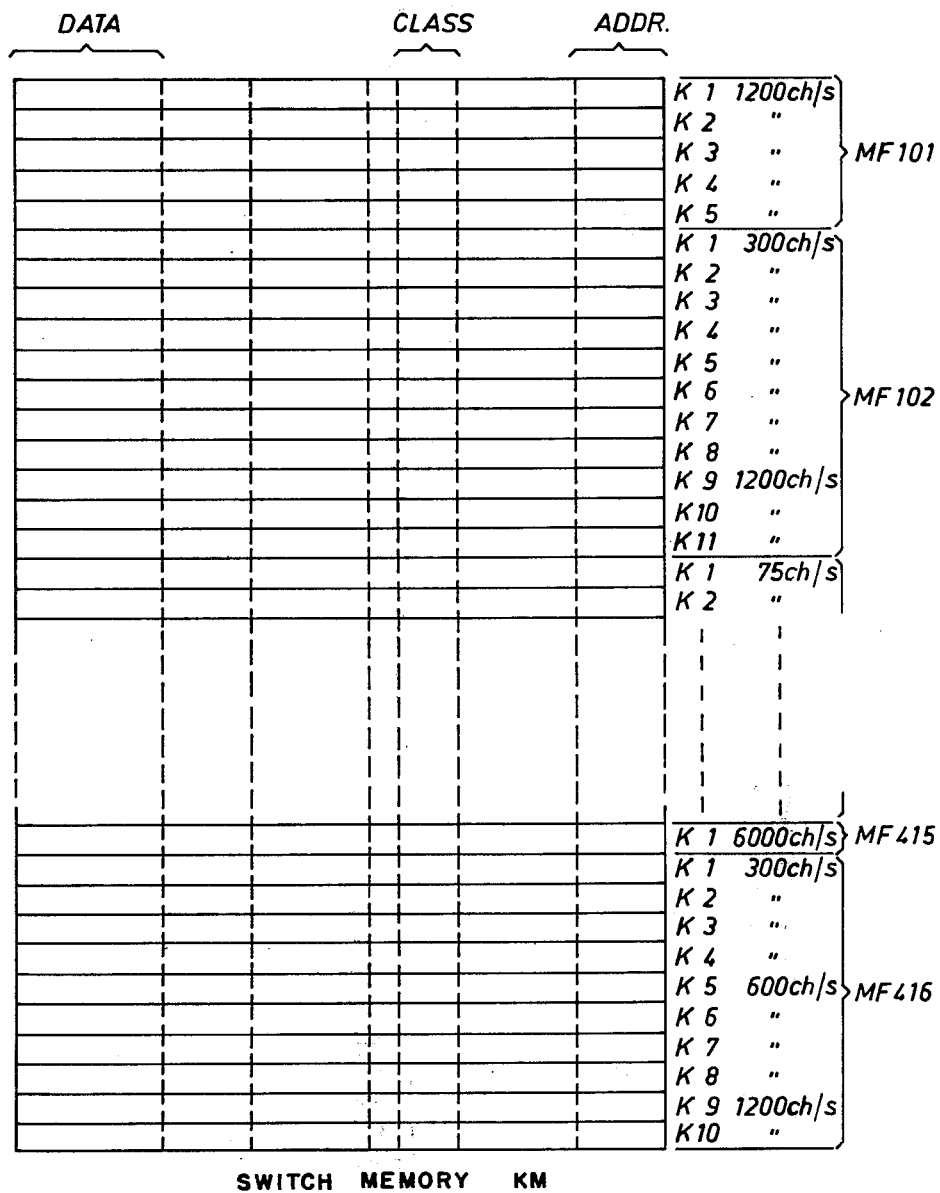
Figure 5:
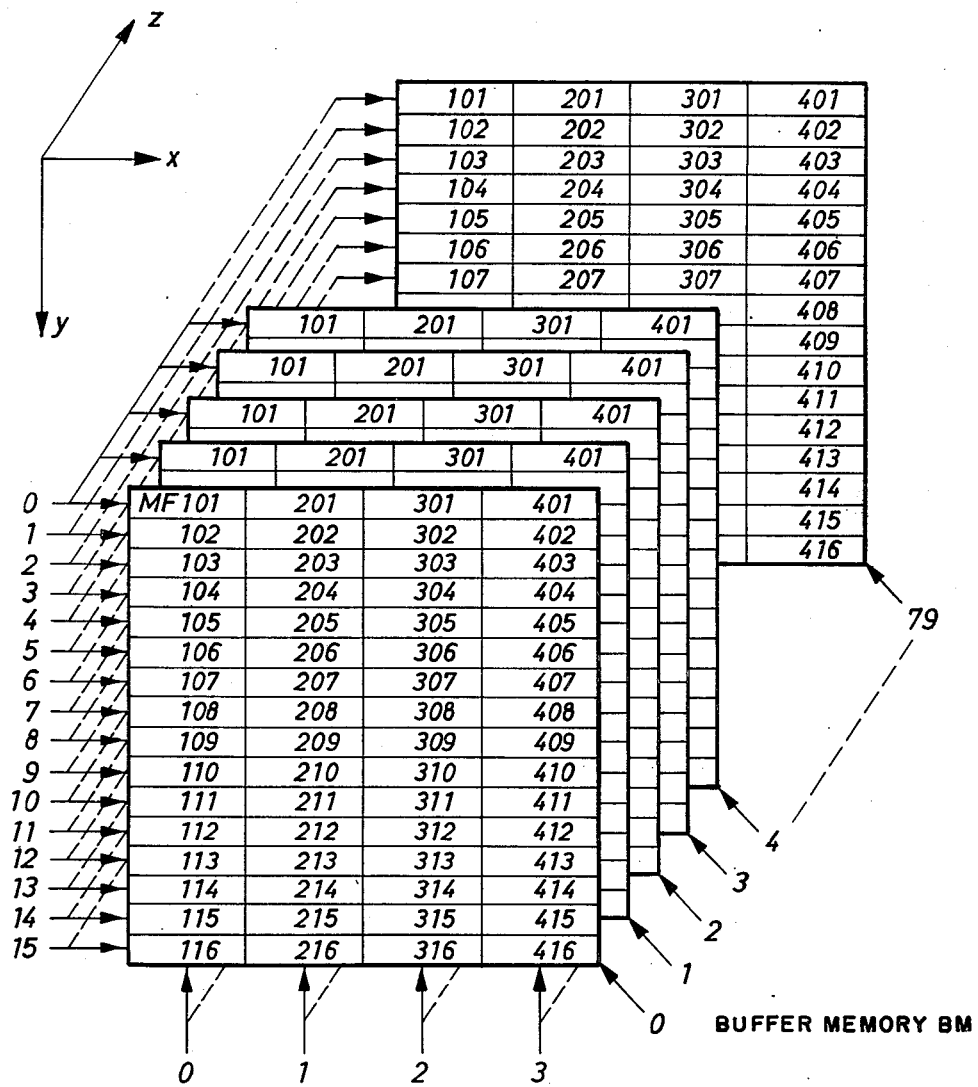
Figure 6:
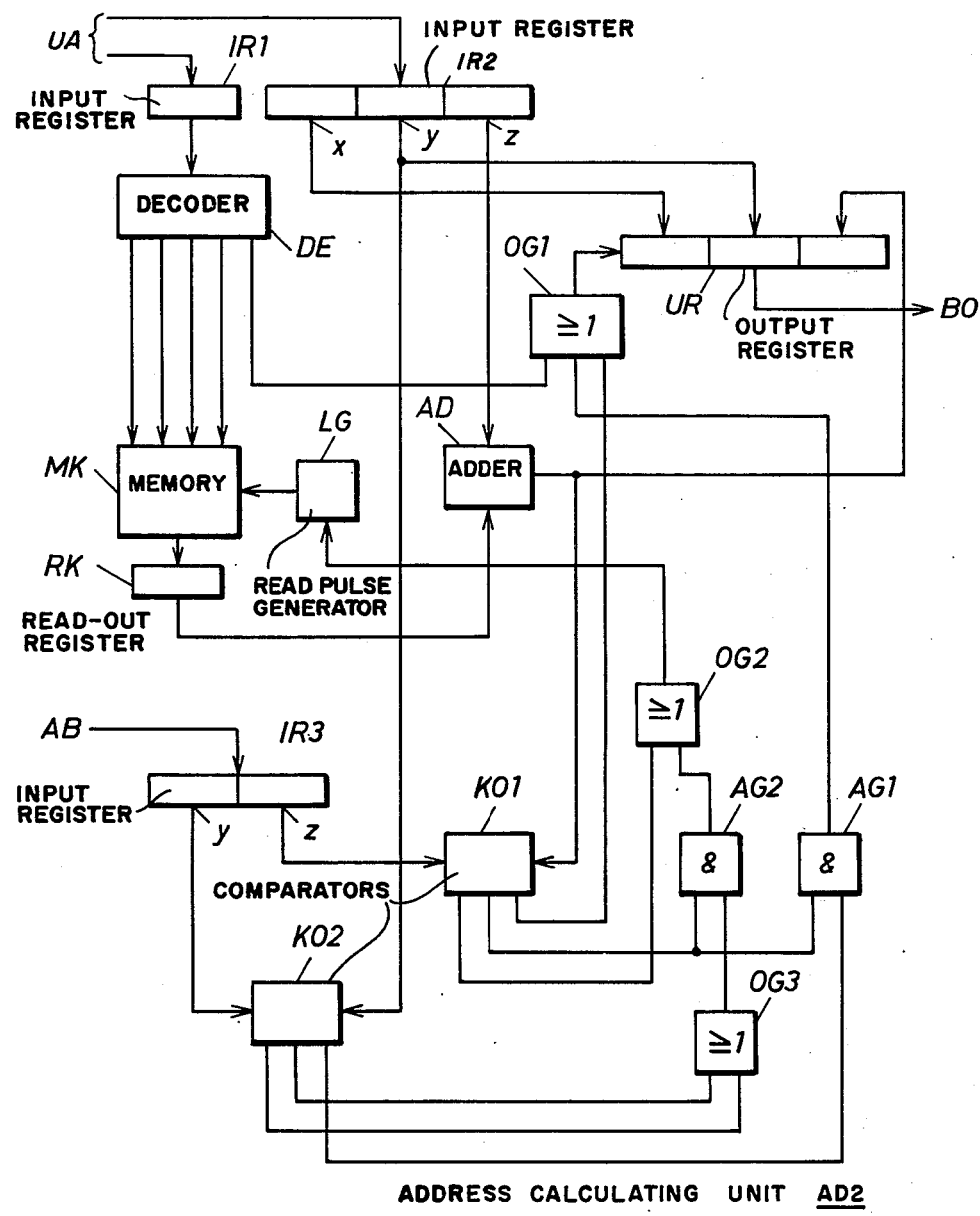

In the following an embodiment of the invention will be described with reference to the accompanying drawing wherein:

FIG. 1 is a block diagram of a transit exchange;
FIG. 2 is a timing diagram which illustrates the formation of data channels of several rates in a time division multiplex frame;
FIG. 3 is a timing diagram which shows the principle for scanning of the multiplex connections;
FIG. 4 is a schematic diagram of the switch memory organization;
FIG. 5 is a schematic diagram of the buffer memory organization; and
FIG. 6 is a schematic diagram of the addressing apparatus according to the invention.

FIG. 1 shows a transit exchange to which each one of the 4 · 16 = 64 two-way connections MF 101-MF 416 is connected via a line equipment LU 101 - LU 416. Each of the connections is arranged for the transfer in time division multiplex of a number of data channels with several rates which are multiples of a basic rate. This basic rate is determined in a known manner by the number of time slots in a time division multiplex frame. According to the present embodiment the TDM frames are assumed to be character oriented and, besides the synchronization information, to comprise 80 time slots for data signals, each representing the basic rate of 75 characters per second. In FIG. 2 the positioning of 3 different data channels in a TDM connection is schematically shown. Line a shows a number of frames in which the time slots which are utilized have been marked with different symbols and on the lines b, c and d a series of data elements are illustrated, e.g. characters, corresponding to each of the channels with the data rates 1, 2 and 4 times the basic rate for the connection. The line equipments are arranged in 16 groups, for example equipments LU 101 - LU 116, each of which is connected to a multiplexor, e.g. MX1, and to a demultiplexor, e.g. DX1, having the task to switch through the connections in selected time slots to an incoming common multiplexor bus line MB and to individual outgoing demultiplexor bus lines, e.g. DB1. The multiplexors MX1 - 4 together constitute a sampling arrangement for the signal values of the incoming data channels and the demultiplexors DX1 - 4 together constitute a reading arrangement for the transfer of indication values representing the signal values of the outgoing data channels to a regeneration arrangement included in each line equipment as will be described later. Each line equipment also includes circuits for the mutual synchronization of on the one hand the transit exchange and on the other hand the frame structures of the multiplex connections. All these circuits are known per se.

The sampling and the reading operate synchronously and they are controlled by an address counter AR by means of address information which is transferred to all multiplexors and demultiplexors through the bus line AB according to a cyclic pattern where each time slot in every multiplex connection is addressed at a repetition rate of 75 times per second. At each addressing occasion a series of sampling values carrying the information in a time slot are transferred to a read-in buffer IB, at the same time as the indication values referring to the corresponding time slot in the outgoing direction are transferred from a read-out buffer, e.g. UB1. The switching-through of the information from the read-in buffer to the read-out buffers takes place in a central switching equipment CK.

The equipment CK comprises a switch memory KM to which the incoming time slot information is brought via a data bus DB by means of address information KO from an address calculating unit AD1. The data signals stored in the switch memory are processed by the switch logic KL which is supported by the control computer SD. The signal processing concerns, for example, the decoding and storing in the switch memory of the outgoing address during the course of a setting-up procedure. From the switch memory the data signals are transferred via the switch logic to a buffer memory BM where they are stored in the memory locations belonging to the outgoing time slots. In this connection the address stored in the switch memory is utilized, after conversion in an address calculating unit AD2.

The multiplex connections are addressed cyclically, whereby every cycle comprises 16 sequences of 5 steps each. During the first address step in each sequence, information relating to an outgoing time slot belonging to one multiplex connection in each of the four demultiplexors DX1 – DX4 is transferred from the buffer memory BM to the four read-out buffers UB1 – UB4. During the following four address steps the four read-out buffers are read out in turn to the respective time slots at the same time as the information from an incoming time slot in the same multiplex connections is transferred in turn via the multiplexors MX1 – MX4 to the read-in buffer IB. At the same time as the information in a time slot is written into the corresponding memory location in the switch memory KM, information is read from the previous time slot into a position in the buffer memory being at the same time indicated by the address calculating unit AD2. The writing into the buffer memory is then made to memory positions belonging to consecutive time slots of each individual data channel in a manner which will be described later.

The addressing procedure is illustrated in the timing diagram, FIG. 3, where the relative timing conditions for four different TDM connections are shown on the lines a, b, c and d, each comprising 80 time slots per multiplex frame. Within the duration of a time slot (according to the example the time slots 36, 71, 30 and 18, respectively, for the frames shown), all the multiplex connections are scanned in a cycle comprising, according to the example, 64 steps in accordance with the timing pulses on line e. As previously described, the cycle comprises sixteen sequences, each having five steps. The five steps relating to sequence number 1 of the cycle are shown on the lines f–j. During step 001, according to line f, the above information transfer from the buffer memory BM to the read-out buffers UB-1–UB4 is made for the outgoing multiplex connections MF 101, 201, 301 and 401. During the following step (101) a time slot is read in from the incoming multiplex connection MF 101 and a time slot is read out to the outgoing multiplex connection MF 101 in synchronism with new write-in operations in the switch memory and the buffer memory. During the next step (201) the multiplex connection MF 201 is treated in the corresponding way and so on until the cycle is completed by the treatment of the multiplex connection MF 416.

The switch memory KM, as shown in FIG. 4, has a memory area for each of the 64 multiplex connections MF 101–416. In each area there is a memory location for each of the data channels in the respective multiplex connections, the number of channels depending on the allocation of the time slots to different rates. The greatest number of channels (80) is obtained if all the channels have the data rate 75 characters per second. The other extreme case is that all of the time slots in a multiplex connection, for example MF 415, are utilized for one data channel only with the rate 6000 characters per second. Between these extreme cases there are multiplexes with a varying number of channels of different rates within the range 75–1200 characters per second. Thus, according to the figure, connection MF 101 has five data channels K1–K5, all with the data rate 1200 ch/s, while for example multiplex connection MF 416 has 10 data channels, of which two are for 1200 ch/s and the others are equally divided between 300 and 600 ch/s. The writing of information into the respective memory locations occurs at a repetition rate determined by the data rate of the data channels and in accordance with the address information obtained from the address calculating unit AD1. As previously mentioned, an analysis of the incoming information occurs in connection with the setting up phase, whereby the address to the outgoing direction is determined. This address is stored in the memory location segment marked ADDR in the figure. In the segment CLASS the data rate of the channel is indicated and in the segment DATA the data signals are written which are to be transferred to the buffer memory. Other segments are intended for various purposes such as status information, signal analysis, time measurement and so on.

As mentioned earlier the buffer memory BM has a memory location for every outgoing time slot in each of the multiplex connections. As shown in FIG. 5 the buffer memory is divided into a number of memory planes or areas, each of which contains a memory location for each multiplex connection. Each memory plane corresponds to one of the eighty time slots in the multiplex frame. The memory locations are arranged in four columns corresponding to the four demultiplexors DX1–DX4 and each column, consequently, comprises sixteen lines which are scanned during an address cycle. During the cyclic addressing process described earlier, the buffer memory is scanned by means of an address counter AR in such a manner that, for the duration of a time slot, information from the buffer memory is read out to each of the outgoing multiplex connections. During the one and same address step, a read-out is then made to a connection in each of the four demultiplexors, for example to the connections MF101, MF201, MF301 and MF401. When writing into the buffer memory, one at a time of the memory locations is addressed with the aid of the address calculating unit AD2 in accordance with the information which is read from the segments ADDR and CLASS in the switch memory KM at the same time as the information in the word segment DATA. When writing in data signals which refer to a data channel comprising more than one time slot in the multiplex frame, the selection of a memory plane is made in a way which is advantageous to the transfer time by utilization of address information from the address counter AR in a manner which will be described later.

According to the preceding, a total of $80 \cdot 16 \cdot 4 = 5120$ memory words is required for storage of the data signals which are read from the switch memory. The address to a memory location can thus be expressed with 13 binary digits and may, for instance, consist of three address parts, corresponding to the coordinate axis, $x$, $y$, $z$ drawn in the Fig. From the address counter AR only the address parts $y$ and $z$ are received, but from the address calculator unit AD2 all three parts are received. The most significant address part, according to the shown memory construction, is $z$ which selects the memory planes. After that follows the part $y$ which selects the lines and lastly $x$ which singles out the columns or the separate memory words on an addressed line. For the sake of clarity the binary form will not be used, but the address parts will be decimal from 0.

In FIG. 6 is shown an example of how the address calculating unit AD2 can be constructed. The apparatus comprises three input registers IR1, IR2, IR3 for storage of the basic information necessary for the address calculation and an output register UR for storage of the calculated address. Further included are a decoder DE and a memory MK together with a read-out register RK and a read pulse generator LG to produce the address constants applying to the different data rate classes, as will be described later, and an adder AD the addition of address constants to the input address. The arrangement also comprises a pair of comparators KO1, KO2, two AND-gates AG1, AG2, and three OR-gates OG1, OG2, OG3, which handle the logic processing.

From input UA from the switch memory KM the addressing apparatus AD2 receives the information CLASS which is stored in the input register IR1, and the information ADDR which is stored in the input register IR2. The information CLASS states the data rate of the data channel being presently addressed in the switch memory and the information ADDR states the address to the memory location in the buffer memory BM which refers to the first time slot of the data channel. According to the figure, register IR2 is divided into three parts. These parts correspond to the three address parts $x$, $y$, $z$ mentioned earlier and consequently they refer to the column and the line in the memory plane which contains the first time slot of the above mentioned data channel. As an example we may assume that the data channel in question belongs to multiplex connection MF205, that it works with the data rate 300 ch/s and that it is inserted in time slots Nos. 12, 32, 52 and 72 (numbering 0-79). Thus, a class code which arrives to register IR1 is decoded by decoder DE and indicated on one of its five outputs, one of which is connected to the OR-gate OG1 while the others are connected to the constant memory MK. According to the example, register IR2 receives an address which is composed of the three address parts $x = 1, y = 4, z = 12$. Of these parts, the $x$ and $y$ parts are transferred directly to the output register while the $z$ part is presented to the adder AD for further processing by the logic circuits. The result is transferred to the output register upon reception of a write pulse from the gate OG1 after completed processing, and the complete address can be fed out on path BO. The logic processing is based partly on the class designation and partly on the address information which is received on path AB from the address counter AR and which gives the address of the memory location in the buffer memory which has last been read from the read-out buffers UB1-UB4. We may assume that the memory location has the address parts $y = 9, z = 52$ which are stored in register IR3.

According to the preceding assumptions the data channel works with the rate 300 ch/s and consequently it belongs to one of those rate classes which are indicated to the constant memory. The class 75 ch/s is not indicated to the memory, but instead to the OR-gate OG1 which implies that the address in register IR2 is transferred to the output register UR without logic processing. In the present case, the address part $z$ is transferred via the adder AD which receives the constant O on its input from the register RK, as the register is assumed to be initially O-set. In the following, the treatment of the exemplified channel for 300 ch/s will be described.

The logic processing starts with a comparison of the time slot number for the last read-out from the buffer memory with the first time slot number of the actual channel. The former number is represented by the address part $z$ in the input register IR3 and the latter one by the address part $z$ in the input register IR2 which is presented on the output of the adder AD. The comparison is carried out in the comparator KO1 which has 3 outputs. The left hand output indicates that the $z$-value from register IR3 is the larger one, the right hand output indicates that the $z$-value from the adder AD is larger and the center output that the values are equal. According to the example the $z$-value in register IR2 = 12 and in register IR3 = 52 and thus an indication is obtained on the left hand output from comparator KO1. The read pulse generator LG is activated via the OR-gate OG2 and emits a first pulse to the constant memory MK. As a result of this, a value is fed to the register RK, stating the increment which is to be added to the address part $z$ for the actual data channel in order to create the address to the next time slot. This increment is added to the $z$-part in the adder AD and thus gives rise to a new value for comparison, in this case 12 + 20 = 32. The comparison gives the same result as before and therefore a new read-out from the constant memory is initiated. The value 20 is read once more and is added to the previous value 20 residing in register RK and consequently the result 12 + 40 = 52 is now received from the adder AD. This time the comparator indicates equality between the two $z$-values which implies activation condition to one of the inputs of each of the AND-gates AG1 and AG2. Activation of either of the two other inputs occurs in dependence on a comparison made between the address parts $y$ stored in the registers IR2 and IR3, i.e. between the line addresses for on the one hand the actual data channel and on the other hand the memory word read out last. If the comparison shows that the memory word which contains the actual data channel has not yet been read out, i.e. that the $y$-part in register IR2 is the larger one, an indication is obtained on the right hand output from the comparator KO2. The gate AG1 thus has its second activation condition fullfilled and via the OR-gate OG1 it causes transfer of all address parts to the output register UR. If, on the other hand, the comparison shows that the memory word in question has already been read out, either in the addressing cycle in progress or in an earlier addressing cycle this is indicated on the center or the left hand output, respectively, from the comparator KO2. In the present case the comparator receives the values $y = 4$ from register IR2 and $y = 9$ from register IR3 and therefore an indication is obtained on the left hand output from comparator KO2. By that the gate AG2 has its second activation condition fullfilled via the OR-gate OG3 and activates the read pulse generator LG via OR-gate OG2. The read pulse generator emits a new read pulse to the constant memory and in the register RK the value 20 is again added to the previous value 40. In this manner the $z$-value 12 + 60 = 72 will be indicated on the output of the adder, which value is greater than 52. An indication is then obtained on the right hand output from the comparator KO1 and via gate OG1 a transfer is caused to the output register UR of the address parts $z$ and $y$ from the input register IR2 and of the address part $z$ from the adder AD. The address supplied to the output BO will in this manner have $x = 1, y = 4, z = 72$.

The highest valid value for the address part $z$ is 79. In the process of adding the values from the constant memory it often occurs that this value is exceeded, but in such cases a value should be indicated to the output register corresponding to the first time slot of the actual channel, while to the comparator KO1 a value is to be indicated which gives the correct result when being compared with the $z$-value from register IR3. A solution to this problem is to let the adder present its results with an additional digit (hundreds digit) which can be regarded by the comparator KO1 but be neglected by the output register. In this manner, the adder AD can present numbers in the series 000–079, 100–179 which for the output register will appear as two cycles of the series 00–79, while the comparator will have the ability to carry out a correct comparison between the numbers from the adder, which can be greater than 79, and the numbers from register IR3, which can never be larger than 79. If thus the conditions of the present example has been such that another read-out from the constant memory had to be made, the result of the addition would have been $z = 12 + 80 = 112$, which is not a pure decimal notation, as the first digit 1 has the decimal value 80. When transferring the z-value to the output register this first digit disappears and the resulting address thus gets the address part $z = 12$ which is the first time slot for the data channel.

We claim:

1. In a TDM-system having a transit exchange connecting incoming TDM-links to outgoing TDM-links which carry data channels with different data rates having one or more time slots in a TDM-frame in accordance with the data rates of the data channels wherein the transit exchange includes a switch memory for the storage of incoming data signals in memory positions, each of which is assigned to one of the incoming data channels in the incoming links, and a buffer memory to which the data signals are transferred and stored in memory positions assigned according to the sequence numbers of the time slots belonging to the respective data channels in the outgoing links before being sent out via the outgoing links, and wherein the write-in and read-out of the buffer memory occurs alternately at a repetition rate determined by the data rate of the respective channel in such a manner that the read-out to the outgoing TDM-links occurs cyclically with each cycle encompassing the reading of a time slot having a certain sequence number for each of the links, the method of minimizing the transfer time of data signals through the transit exchange by writing into a memory position of the buffer memory data signals of a data channel which is assigned more than one memory position, the memory position being the one which is next in turn for a read-out, comprising the steps of comparing the sequence number of the time slot read out last with the sequence number of the first appropriate time slot in the TDM-frame assigned to the actual data channel whose data signals are being transferred, then if the latter sequence number is higher, writing the data signals of said actual data channel into the memory position which corresponds to said appropriate time slot, if said latter sequence number is lower, comparing said last sequence number with the sequence number of the next appropriate time slot assigned to said actual data channel, repeating said comparing steps until a higher sequence number is found, writing the data signals of said actual data data channel into the memory position of the buffer memory which corresponds to said found higher sequence number, whereas, if the found sequence number of the time slot is equal to the sequence number of the time slot read out last, or if equality has already been found during the comparision of said last sequence number with the sequence number of the first appropriate time slot assigned to said actual data channel determining whether a readout has been made from the memory position corresponding to the sequence number of said first appropriate time slot to the outgoing TDM-link which transfers said actual data channel, said determining comprising comparing the sequence number of said outgoing TDM-link with the sequence number of the TDM-link to which read-out was made last, after which, if the comparision shows that a read-out of said time slot has been made to the TDM-link which transfers said actual channel, writing the data signals of said actual channel into the memory position which is associated with the next appropriate time slot of said actual channel, while otherwise a write-in is made to the memory position which is associated with the time slot in the process of being read.

2. In a TDM-system having a transit exchange connecting incoming TDM-links to outgoing TDM-links, the links carrying data channels having one or more time slots in a TDM-frame in accordance with the data rate of the channel, the transit exchange including a switch memory, means for connecting the switch memory to the incoming TDM-links whereby data signals from the data channels are stored in memory positions of the switch memory, a buffer memory, means for connecting the buffer memory to the outgoing TDM-links whereby data signals stored in sequence-number-addressed memory positions of the buffer memory are cyclically transferred to the data channels of the outgoing TDM-links, the improvement comprising apparatus for transferring data signals from the switch memory to the sequence-number-addressed memory positions of the buffer memory, said apparatus comprising: means for connecting the output of the switch memory to the input of the buffer memory; and address calculating means for calculating the addresses of the memory positions of the buffer memory which are to receive data signals from the switch memory, said address calculating means comprising first storing means for storing the sequence-number-address of the last preceding memory position whose contents were read from the buffer memory to a data channel of one of the outgoing TDM-links, second storing means for storing the sequence-number-address of one of a plurality of memory positions assigned to the data channel than being transferred, comparison means for comprising the sequence-number addresses stored in said first and second storing means, said comparison means having a first output for indicating that the sequence-number-address stored in said first storing means is greater than the sequence-number-address stored in said second storing means, and a second output for indicating that the sequence-number-address stored in said second storing means is greater than the sequence-number-address stored in said first storing means, address modifying means responsive to said first output for incrementing the sequence-number-address stored in said second storing means by a number of addresses related to the data rate of the data channel than being transferred, and gating means responsive to said second output for activating for the reception of data signals from the switch memory the memory position of the buffer memory associated with the sequence-number-address then being generated by said address modifying means.

3. The apparatus of claim 2 wherein each of said sequence-numbered addresses comprises at least two parts, a first part related to a specific one of the time slots in a TDM-frame and the other part related to a specific one of the TDM-links, the addresses being sequentially ordered first with respect to time slots and then within each time slot with respect to TDM-links, said comparison means having a first comparator for comparing the first parts of the sequence-number addresses stored in said storing means, and said first comparator having first and second outputs which are the first and second outputs of said comparison means.

4. The TDM-system of claim 6 wherein said first comparator includes a third output for indicating that the first parts of the sequence-number addresses stored in said first and second storing means are equal, and said comparison means further comprises a second comparator for comparing the second parts of the sequence-number addresses stored in said first and second storing means and having a first output for indicating that the second part of the sequence-number-address stored in said first storing means is greater than the second part of the sequence-number-address stored in said second storing means and a second output for indicating that the second part of the sequence-number-address stored in said second storing means is greater than the second part of the sequence-number address stored in said first storing means and a third output for indicating that the second part of the number stored in said first storing means is equal to the second part of the sequence-number-address stored in said second storing means, first logic means responsive to the third output of said first comparator, and the first output or third output of said second comparator for activating said address modifying means, and second logic means responsive to said third output of said first comparator and the second output of said second comparator for activating said gating means.

* * * * *